(12) United States Patent
Chamberlin et al.

(10) Patent No.: US 9,139,097 B2
(45) Date of Patent: *Sep. 22, 2015

(54) SAFETY COVER WITH INTEGRATED MAGNET FOR REED SWITCH

(75) Inventors: Bradley D. Chamberlin, Pendleton, IN (US); Colin Hamer, Noblesville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 858 days.

This patent is subject to a terminal disclaimer.

(21) Appl. No.: 13/344,079

(22) Filed: Jan. 5, 2012

(65) Prior Publication Data

US 2013/0175854 A1 Jul. 11, 2013

(51) Int. Cl.
| | |
|---|---|
| *B60L 1/00* | (2006.01) |
| *B60L 3/00* | (2006.01) |
| *B60L 3/04* | (2006.01) |
| *H01R 13/447* | (2006.01) |
| *H02K 5/22* | (2006.01) |
| *H02K 11/00* | (2006.01) |
| *H01R 13/62* | (2006.01) |

(52) U.S. Cl.
CPC ............... *B60L 3/0069* (2013.01); *B60L 3/04* (2013.01); *H01R 13/447* (2013.01); *H02K 5/225* (2013.01); *H02K 11/001* (2013.01); *H01R 13/6205* (2013.01); *Y02T 10/641* (2013.01)

(58) Field of Classification Search
USPC .......................................................... 307/91
See application file for complete search history.

(56) References Cited

U.S. PATENT DOCUMENTS

| | | | |
|---|---|---|---|
| 4,114,194 A | 9/1978 | Walter | |
| 6,530,892 B1 | 3/2003 | Kelly | |
| 6,664,678 B2 | 12/2003 | Shimizu | |
| 6,668,963 B2 * | 12/2003 | Nada .............................. | 180/279 |
| 7,084,361 B1 | 8/2006 | Bowes et al. | |
| 7,125,268 B1 | 10/2006 | Marukawa et al. | |

(Continued)

FOREIGN PATENT DOCUMENTS

| | | |
|---|---|---|
| JP | 2002-367666 A | 12/2002 |
| JP | 2006-168600 A | 6/2006 |
| JP | 2011-238359 A | 11/2011 |

OTHER PUBLICATIONS

International Search Report and Written Opinion, PCT/US2013/020063, Apr. 22, 2013.

*Primary Examiner* — Jared Fureman
*Assistant Examiner* — Duc M Pham
(74) *Attorney, Agent, or Firm* — Bose McKinney & Evans, LLP

(57) ABSTRACT

An electric power source supplies electrical power to an electric machine of a vehicle via a plurality of high voltage lines. A plurality of connections are disposed within a housing for connecting the high voltage lines. A cover member encloses a hidden magnet and is removably secured to the housing so that removal is necessary to obtain access to the high voltage lines. A reed switch is mounted proximate the cover member, when secured, within a magnetic field of the magnet, whereby the reed switch is closed when the cover member is secured and is open when the cover member is removed. A controller is controllably coupled to the power source via a control connector and circuit of the electric machine. Such circuit extends from the reed switch to the controller, where the controller causes the electric power source to stop supplying electrical power when the cover member is removed.

21 Claims, 8 Drawing Sheets

(56) References Cited

U.S. PATENT DOCUMENTS

| | | |
|---|---|---|
| 7,427,447 B2 | 9/2008 | Nishiumi |
| 7,508,097 B2 | 3/2009 | Furuta et al. |
| 7,586,722 B2 * | 9/2009 | Scholer et al. ................. 361/88 |
| 7,613,003 B2 | 11/2009 | Pavlovic et al. |
| 7,679,211 B2 | 3/2010 | Tabatowski-Bush et al. |
| 7,816,804 B2 | 10/2010 | Soma et al. |
| 7,863,781 B2 | 1/2011 | Marukawa et al. |
| 7,909,130 B2 | 3/2011 | Morikawa et al. |
| 7,915,753 B2 | 3/2011 | Endo et al. |
| 2006/0201277 A1 | 9/2006 | Reisch et al. |
| 2009/0200878 A1 | 8/2009 | Walter |
| 2010/0084205 A1 | 4/2010 | Tarchinski et al. |
| 2010/0127565 A1 | 5/2010 | Fukazu et al. |
| 2010/0320853 A1 | 12/2010 | Isogai et al. |
| 2011/0306223 A1 * | 12/2011 | Bauer .......................... 439/136 |
| 2013/0076059 A1 * | 3/2013 | Zalan et al. ................ 296/97.22 |
| 2013/0175853 A1 * | 7/2013 | Chamberlin et al. .......... 307/9.1 |

\* cited by examiner

SAFETY COVER WITH INTEGRATED MAGNET FOR REED SWITCH

BACKGROUND

The invention relates generally to vehicular electrical systems and, more particularly, to an apparatus and system for reducing a danger of contact with high voltage present in a vehicle.

Electric vehicles are generally propelled by one or more electric or traction motors powered by electricity, alone or in combination with non-electric propulsion, for example, motive force provided by an internal combustion engine. A source of such electric power may be stored electricity, for example, from a battery bank, electricity generated within the vehicle, and/or electricity received from an external source, such as a trolley in electrical communication with overhead power lines.

In many applications, the designed performance characteristics of an electric vehicle can only be achieved by supplying dangerous high voltages to a drive system. Direct current (DC) voltage may be directly supplied to a DC motor or it may be converted to alternating current (AC) by an inverter circuit that supplies power to an AC motor. A generator of a vehicle may be configured to output either DC or AC voltage. An electric motor may be operated as a generator. Electric power line(s) supplying electricity to a motor of an electric vehicle may be variously arranged in series and/or parallel configurations. An on/off state of such electric power line(s) is typically controlled by one or more controllers.

One or more electric motors of an electric vehicle may be positioned in proximity to a transmission. In such a case, for example, an electric motor may be a cartridge type motor structured to be slidingly removable from a larger housing. For this and other configurations, a worker servicing the vehicle may have difficulty physically accessing the electric power lines, for example within a small engine compartment of a passenger car.

In order to reduce a danger of injury to those in proximity to dangerous high voltage(s) of an electric vehicle, an interlock has been conventionally used to cause a controller to decouple such high voltage(s). The controller may be an electronic control unit powered by a low voltage obtained from a vehicle battery and structured for sending/obtaining low voltage signals to/from various locations of the vehicle. In one common form, a mechanical limit switch is secured within a metal housing so that a protruding portion of a housing cover engages an arm of the limit switch. When the cover is mounted to the housing, the protruding portion engages the arm and the contacts of the limit switch are thereby closed, which causes the controller to enable the provision of electricity to the power lines. When the cover is removed, the protruding portion is pulled away from its engagement with the arm and the contacts of the limit switch are thereby opened, which causes the controller to provide electricity to the power lines. Many different variations exist for removing or applying a high voltage to power lines of an electric vehicle. For example, a connection or disconnection may include, but are not limited to, mechanical, electrical, semiconductor, inductive, and other structures for applying or removing a voltage. A strong supporting structure is required for mounting the limit switch. The wiring to the limit switch may necessitate the use of an additional connector which further reduces available servicing space within an engine compartment. For example, such a supporting structure may be a separate, heavy-duty limit switch housing having an electrical connector formed of heavy gauge metal mounted thereon. Such limit switches and associated installations are costly, heavy, bulky, difficult to install/remove, and are subject to contamination, heat, vibration, and related reliability issues.

With respect to reducing a danger of injury to persons working near dangerous high voltage(s) of an electric vehicle, conventional interlock devices and systems are not optimized for service, repair, or manufacturing of electric vehicles.

SUMMARY

The subject invention provides a vehicular subsystem and electric machine that simplify and make safer a servicing or repair operation being performed near high voltage lines of an electric vehicle. Similarly, a manufacturing cost for time and materials is reduced.

In one embodiment, a vehicular subsystem is provided for use in a vehicle having at least one wheel. The subsystem includes an electric machine operably coupled with the wheel, the electric machine having a housing. The subsystem also includes an electric power source for supplying electrical power to the electric machine via a plurality of high voltage lines, a plurality of electrical connections disposed within the housing of the electric machine for electrically connecting the high voltage lines with the electric machine, a controller controllably coupled to the power source, a plurality of access ports extending through the housing, each access port providing access to a respective one of the electrical connections, and a cover member removably secured to the housing and requiring removal to obtain access to any of the plurality of access ports, the cover member enclosing a hidden magnet therewithin. The subsystem also includes a reed switch mounted proximate the cover member, when secured, within a magnetic field of the magnet, whereby the reed switch is closed when the cover member is secured and is open when the cover member is removed. The subsystem also includes at least one low voltage communication line extending from the reed switch to the controller, where the controller causes the electric power source to stop the supplying of electrical power when the cover member is removed from the housing.

In another embodiment, an electric machine is provided that includes a housing having a communication connector, an electric motor disposed within the housing, and at least one electrical connection within the housing, the electrical connection being structured for securely receiving a high voltage line from a power source external to the housing. At least one access port is formed in the housing for accessing the electrical connection. The electric machine also includes a reed switch and a unitary cover member removably mounted to the housing, the cover member completely covering the access port whereby the cover member must be removed to gain access to the electrical connection via the access port, the unitary cover member having a magnet that closes the reed switch when the unitary cover member is secured to the housing. The electric machine also includes a communication line in electrical communication with the reed switch and with the communication connector. An external controller can be placed in communication with the reed switch via the communication connector. The reed switch is opened when the cover member is removed. In various embodiments, the electric machine may include a removable access port plug mounted in the access port. In various embodiments, the cover member may be separate from the removable port member. In various embodiments, the electric machine may include pluralities of electrical connections, access ports, and access port plugs.

In yet another embodiment, an electric machine is provided that includes a housing enclosing, in an interior portion, a rotor and a stator having at least one coil, the rotor being structured for outputting mechanical torque to a drive train of an electric vehicle. At least one electrical connection is provided within the interior portion, the electrical connection being structured for securely receiving a high voltage line to allow the coil to be connected with an external power source. At least one access port is formed in the housing to gain access to the connection. The electric machine also includes a single reed switch disposed in proximity to the electrical connection, a cover member removably mounted to the housing to define an area covering the access port and the reed switch, whereby the cover member must be removed to access the access port, the cover member having a plurality of cover portions each having a magnet, cumulative magnetic field strength of the plurality of magnets closing the single reed switch when the cover member is mounted, the single reed switch opening when at least one of the plurality of cover portions is removed. Communication of opening of the single reed switch disconnects high voltage being provided to the high voltage line by the external power source.

The foregoing summary and the abstract of the disclosure do not limit the invention, which is instead defined by the attached claims.

BRIEF DESCRIPTION OF THE DRAWING FIGURES

The above mentioned and other features will become more apparent and the invention will be better understood by reference to the following description of embodiments of the invention taken in conjunction with the accompanying drawing figures, wherein.

Figure 10:
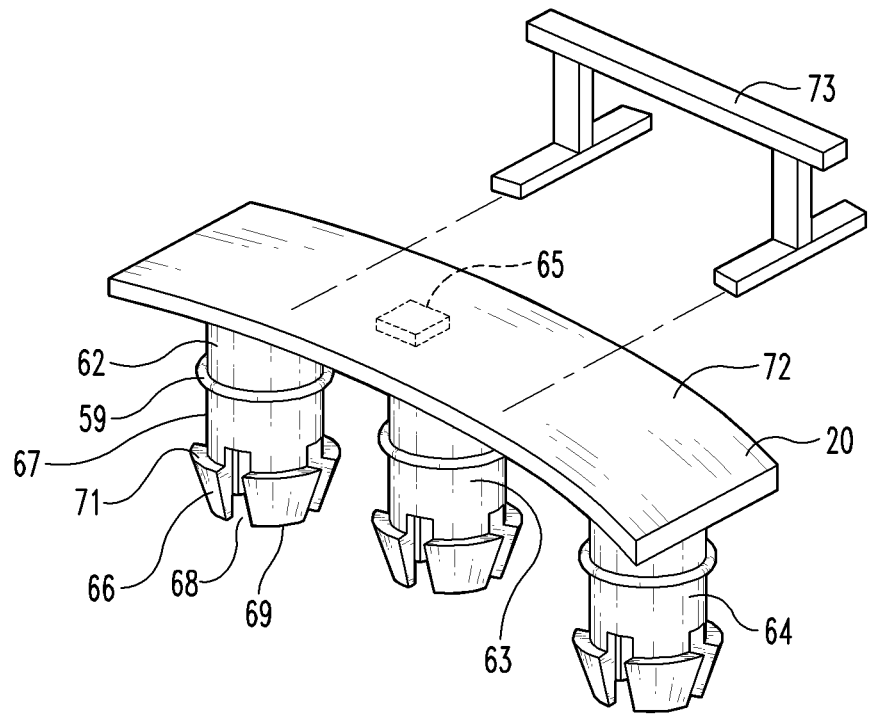
Figure 11:
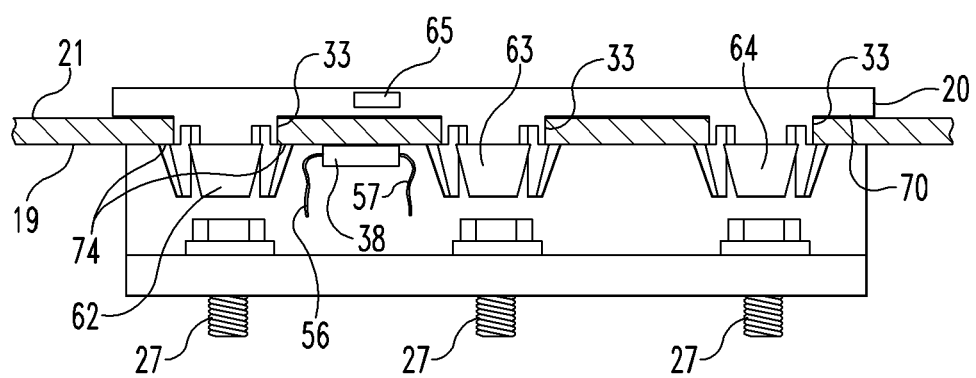

FIG. 10 is a perspective view of a cover plate integrally formed to have three access port plug members, according to an exemplary embodiment; and FIG. 11 is a plan view showing the cover plate of FIG. 10 installed into a portion of a housing so that access port plugs of the cover plate are inserted into electrical connection access ports formed in the housing, according to an exemplary embodiment.

Corresponding reference characters indicate corresponding parts throughout the several views. The illustrated embodiments are exemplary and are not intended to be exhaustive or to be construed as limiting the scope of the invention to the precise forms or applications disclosed.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
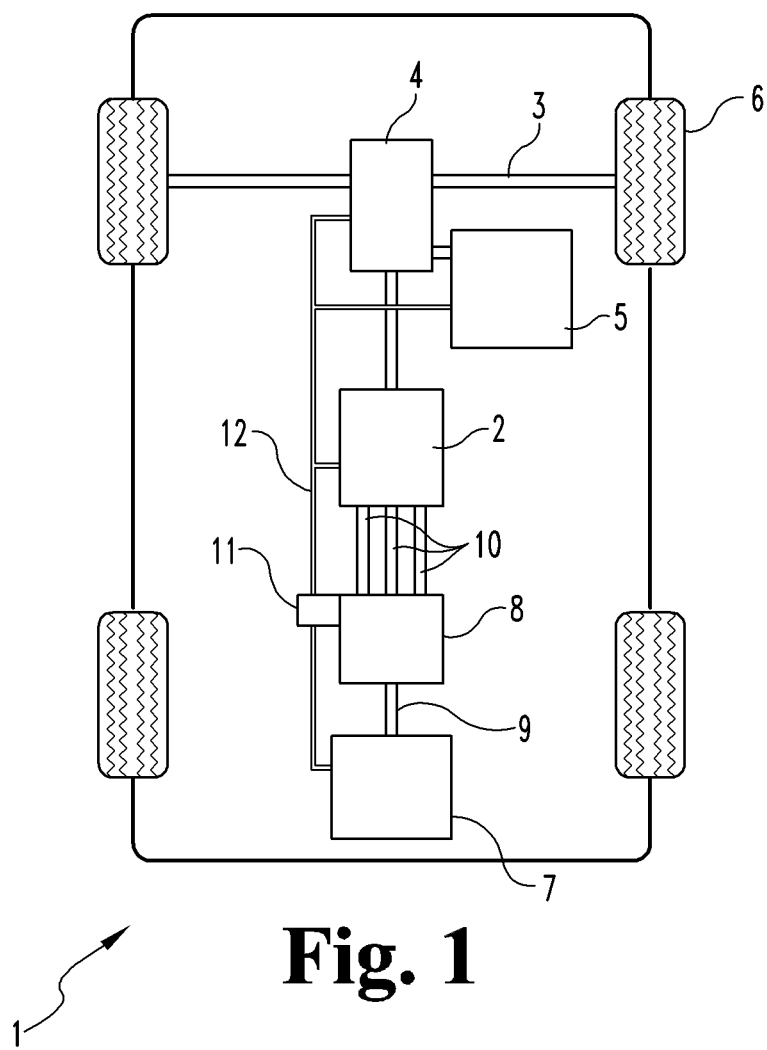
FIG. 1 is a schematic view of an exemplary electric vehicle.

FIG. 1 shows a schematic view of an exemplary vehicle 1 with an electric machine 2 coupled to a drive axle 3 via transmission 4. An internal combustion type motor 5 is also coupled to drive axle 3 via transmission 4. It is noted that, respecting various embodiments, vehicle 1 may be designed and built without transmission 4 (e.g., direct drive) and/or internal combustion type motor 5 (e.g., all-electric). When vehicle 1 is a hybrid, power is provided to drive axle 3 by electric machine 2, internal combustion motor 5, or some combination of the two. As used herein, an "electric vehicle" refers to any vehicle that includes an electric machine as part of its drive train. Wheels 6 are secured to distal ends of drive axle 3 and a second axle (not shown). A high voltage battery pack 7 outputs a DC high voltage to inverter 8 via DC power lines 9. Inverter 8 outputs a three-phase AC high voltage to electric machine 2 via three AC high voltage lines 10. Electrical ground potential is connected to electric machine 2 via a chassis (not shown) of vehicle 1. A controller 11 sends and receives data, such as by use of low voltage electrical signals in communication with the many operational and sensing devices of vehicle 1. Controller 11 may be formed as any number of individual and/or modular controllers. In this example, controller 11 sends and receives low voltage signals via communication lines 12.

Although the example of FIG. 1 shows only one electric machine 2, vehicle 1 may have any number of electric motors, generators, and motor/generators that operate with AC or DC power for producing mechanical power and/or electric power. For example, electric machine 2 may include a motor/generator (a "traction motor") that acts as a motor in producing mechanical power for driving wheels 6 when needed, and that acts as a generator in producing a voltage for charging battery pack 7, such as by use of engine braking. In another example, vehicle 1 may have an electric machine 2 dedicated to an individual wheel 6.

Similarly, battery pack 7 may include any number of individual battery cells arranged in any given configuration. For example, individual cells may be arranged in various locations of vehicle according to available space, temperature and safety considerations, and weight distribution for achieving desired vehicle performance specifications. Typically, individual cells are connected in series for obtaining a DC high voltage, although portions of battery pack 7 may be configured in parallel or some series/parallel combination, for example by use of a switching system. Individual battery cells may be lead acid, lithium-ion, nickel-metal, or another rechargeable type. Battery pack 7 may also include a fuel cell, a capacitor bank, or any other voltage source. Battery pack 7 may be partitioned to provide a DC high voltage for conversion to AC high voltage in inverter 8, and to provide a DC low voltage for operation of lights, sound system, control and sensor circuitry, and other vehicle systems. DC low voltage circuitry may include one or more DC-DC converters.

By way of example, inverter 8 has three separate phase arms in parallel between positive and negative ones of DC power lines 9. Each phase arm contains switching elements and diodes controlled using pulse width modulation signals from controller 11. Intermediate points of the three phase arms are used for outputting AC high voltage on respective ones of the three AC power lines 10. When electric machine 2 is a traction motor, inverter 8 has a switching system for effecting bidirectional conversion of electrical power between electric machine 2 and battery pack 7. For example, inverter 8 converts DC battery voltage into three-phase AC high voltage being supplied to electric machine 2 for driving drive axle 3 with a specified torque. Electric machine 2 generates three-phase AC electric power and inverter 8 converts such AC electricity into DC power for charging battery pack 7, for example, during regenerative braking. In such a case, inverter 8 includes or accesses a battery charging circuit (not shown). Internal combustion motor 5 may also provide energy for charging battery pack 7. It is noted that some vehicle applications may use high voltage for powering a system other than a drive train, such as a high voltage electric compressor of an air conditioning system.

The DC high voltage, in applications such as a golf cart, may be as low as 48 volts, but for all-electric and hybrid type vehicles having a large number of battery cells, the DC high voltage on DC power lines 9 may be 200 to 1000 volts or more. After conversion by inverter 8, this may result in an AC high voltage on AC power lines 10 of 200 to 1000 volts or more. Some applications may utilize 3000 volts and 5000 amperes. Such high voltage is necessary for powering electric machine 2, but is dangerous and may result in severe injury or death if AC power lines 10 are touched. High voltage battery pack 7, and locations within vehicle 1 where power lines 9, 10 extend, may include high voltage warning labels, but these labels will not suffice as protection from injury death if AC power lines 10 are touched. Labels also become worn and dirty over time, rendering them less effective. Further, many people will simply ignore warning labels. As the number of electric vehicles 1 on our roads becomes larger, more of these vehicles are involved in traffic mishaps and wind up in collision repair facilities. More electric vehicles 1 wind up being repaired, serviced, and maintained by untrained personnel who may not follow OEM servicing procedures. Even trained service personnel working in proximity to high voltages may err by wearing metal jewelry, by failing to wear insulating gloves and clothing, or by failing to check whether a power line is "hot" by using a volt meter. Electric vehicle 1 includes electrical disconnects (not shown) that provide additional safety for personnel by controllably switching the connection of electric power to electric machine 2. Controller 11 includes firmware or the like for controlling the disconnecting of AC high voltage from AC power lines 10 in the occurrence of a predetermined sensor state or other vehicle event.

Figure 2:
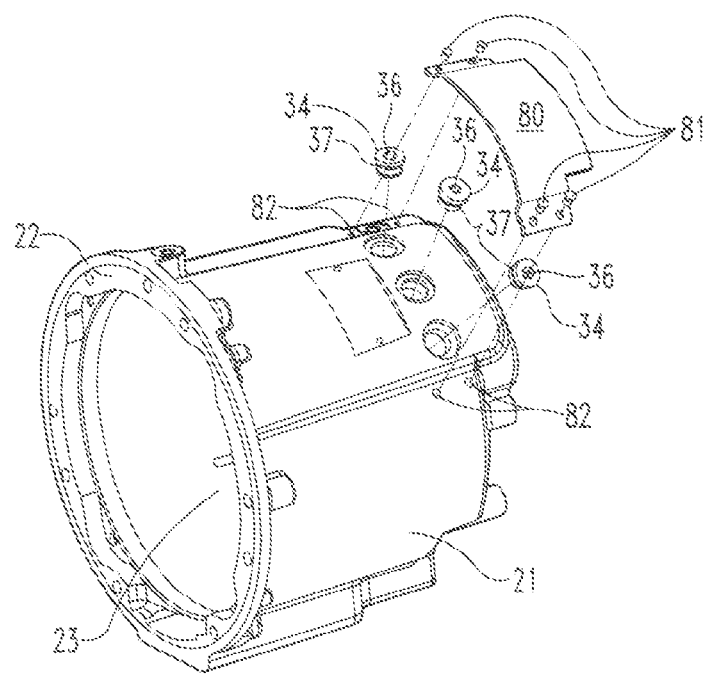
FIG. 2 is a perspective view of a housing, location of high voltage lines entering the housing, associated access ports, and a cover, according to an exemplary embodiment.
Figure 3:
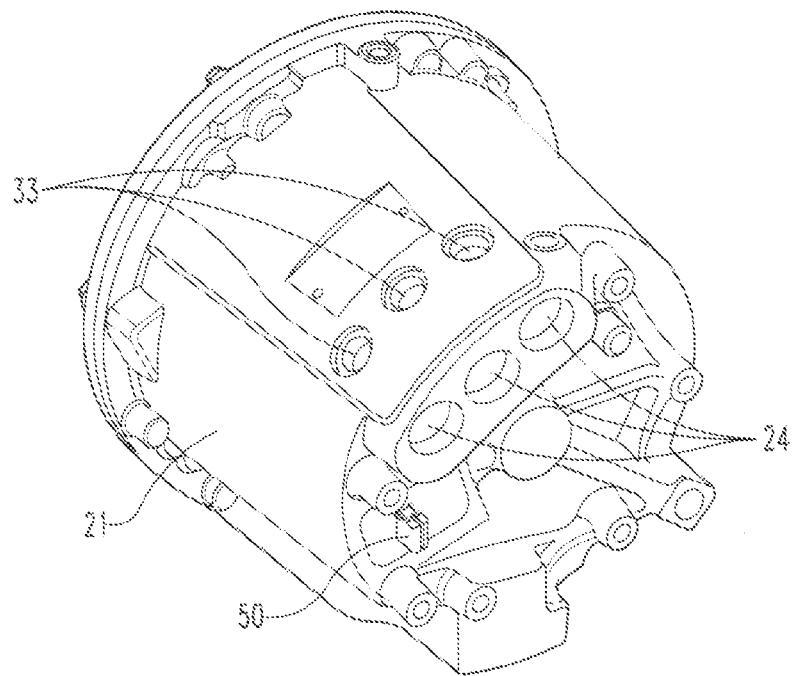
FIG. 3 is another perspective view of the housing of FIG. 2.

FIG. 2 shows an exterior housing 21 for holding electric machine 2. Housing 21 may be formed by a casting operation and has a connecting flange portion 22 for mating engagement with a transmission 4. Housing 21 has a generally cylindrical interior portion 23 for receiving electric machine 2, associated wiring and connections, and other apparatus related to a drive train. Three AC power lines 10 are installed in respective ones of the three high voltage cable entry ports 24 shown in FIG. 3. Depending on required current carrying capacity, each AC power line 10 may be an insulated cable of American Wire Gauge (AWG) #8 to #0000 standard circular cross section copper wire. Three high voltage cable connection access ports 33 are formed in housing 21 to allow service professionals to access the connection of AC power lines 10 to electric machine 2, such as when using a screwdriver to fasten AC power lines 10 to associated connection points inside housing 21. Access port plugs 34 may be inserted into connection access ports 33 after service work or installation has been performed. Battery pack 7 is not connected when vehicle 1 is being assembled at a factory. After battery pack 7 has been installed, controller 11 prevents "live" voltages from being present on AC power lines 10 when unqualified service persons, who may not be trained in safety and protection respecting contact with high voltages, attempt to enter connection access ports 33, as discussed further below.

Each access port plug 34 may have a generally cylindrical shape and is formed of non-conductive, high strength, temperature-resistant resin material. Various other materials such as aluminum or steel may be used in forming connection port plug 34. Access port plug 34 may be formed with threads that mate with corresponding threaded interior portions of access ports 33, or connection port plugs 34 may be formed in any other appropriate manner for insertion into access ports 33. A plurality of access port plugs 34 are installed into respective ones of connection access ports 33 after the installation of AC power lines 10. A tool-receiving cavity 36 is formed in a top end surface of access port plug 34, allowing a service professional to insert a tool (not shown) into cavity 36, and to then pull/push or turn the tool for installing/removing access port plug 34 to/from one of connection access ports 33. An O-ring type seal 37 may be installed to snugly fit around the circumference of the outside wall of access port plug 34. For example, O-ring 37 may be secured in a circumferential groove formed in such outside wall of access port plug 34. When installed, access port plug 34 thereby seals the corresponding high voltage connection point of electric machine 2 against outside contamination and/or interior oil leakage. Various other sealing structures, materials, and methods may alternatively be incorporated into access port plug 34. Alternative interlock devices for access ports of an electric machine are disclosed by Chamberlin, et al. in U.S. patent application Ser. No. 13/344,013 filed Jan. 5, 2012 entitled "Housing Assembly With Reed Switch and Magnet," and incorporated herein by reference in its entirety.

A cover plate 80 is fastened to housing 21 to cover connection access ports 33 after installation of AC power lines 10. For example, cover plate 80 may be secured using fasteners such as screws 81 that are tightened into threaded receptacles 82 formed in housing 21, or by other appropriate fastening structure such as rivets. When cover plate 80 and access port plugs 34 are subsequently removed, entry via connection access ports 33 allows trained service professionals to access the high voltage electrical connections to electric machine 2, such as for performing repairs.

Figure 4:
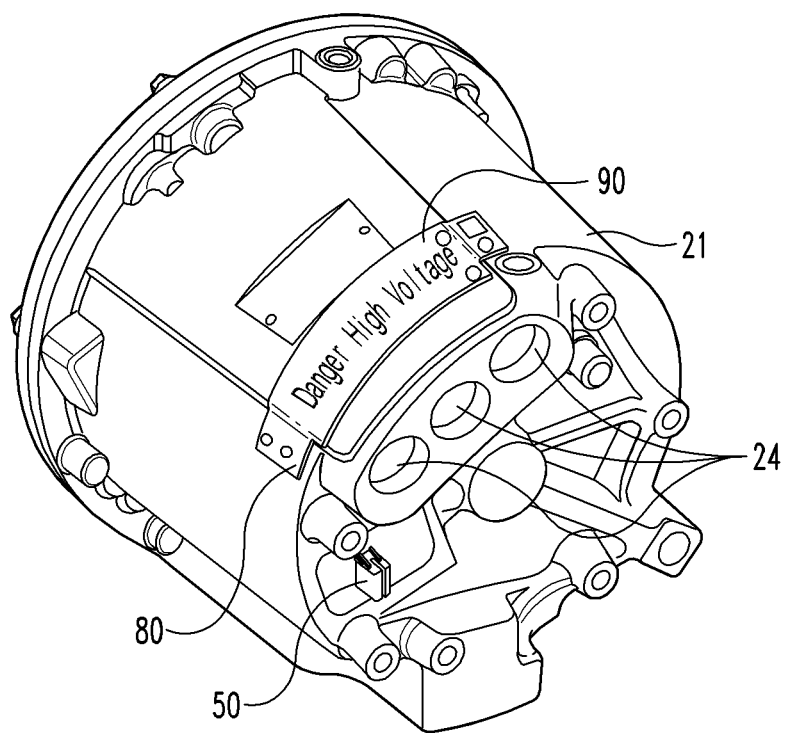
FIG. 4 is a perspective view of a housing having a warning label, according to an exemplary embodiment.

FIG. 4 shows an assembled housing 21 with cover plate 80 fastened thereto. A warning label 90 formed of heat resistant and tear resistant material is affixed to an exterior face of cover plate 80. Warning label 90 displays warning words, "DANGER HIGH VOLTAGE" in large letters and preferably includes red and/or bright yellow portions designed to provide maximum visibility. By placement of warning label 90 on cover plate 80, a person seeking to access a high voltage connection portion of electric machine 2 is forced to see the warning words.

Figure 5:
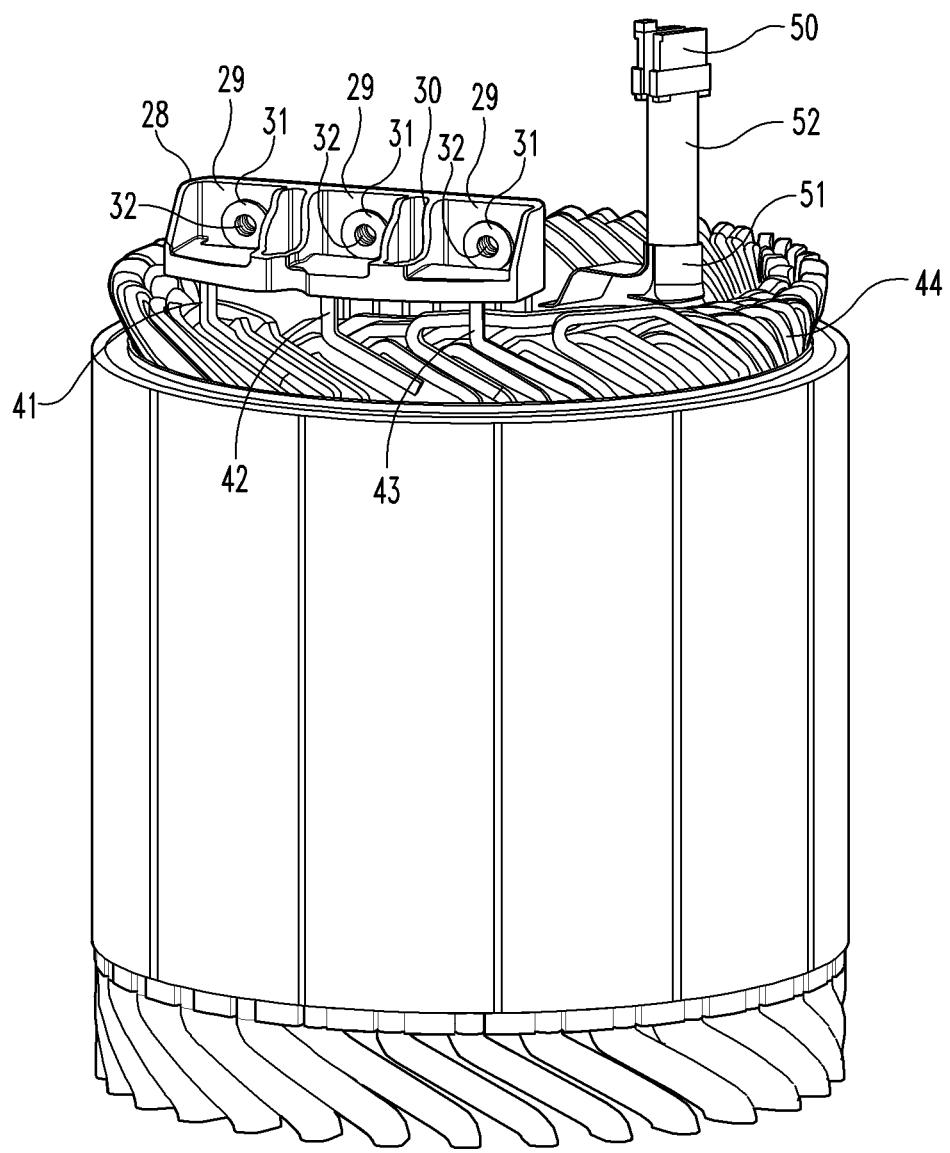
FIG. 5 is a perspective view of an electric machine having a terminal block and a connector, according to an exemplary embodiment.

FIG. 5 shows a terminal block 28 having an insulating portion 30 for partitioning cable receiving portions 29 from one another and for electrically insulating high voltage from various conductive portions of electric machine 2. Terminal block 28 includes three metal inserts 31 for attaching respective ones of AC power lines 10 thereto. Metal inserts 31 may be formed with threaded interior portions 32, so that bolts or other fasteners may be secured thereto. As noted above, metal inserts 31 may alternatively be formed as set screw type connectors (not shown) where, for example, metal insert 31 is formed as a split bolt that receives a bare high voltage cable that is then secured to metal insert 31 by a bolt formed as a set screw. Any appropriate connection system may be used for securely attaching AC power lines 10 to metal inserts 31. Terminal block 28 is positioned at an axial end of electric machine 2. Each metal insert 31 is electrically connected to a respective end of the three phase coils 41, 42, 43 of a stator 44. When electric machine 2 is installed within interior portion 23 of exterior housing 21, the three cable receiving portions 29 of terminal block 28 are aligned with respective ones of cable entry ports 24 of housing 21. Such allows AC power lines 10 to be fed through cable entry ports 24 to terminal block 28, and to then be electrically connected to respective ones of phase coils 41, 42, 43 at coil ends thereof. The other three coil ends of phase coils 41, 42, 43, for example, may be connected to one another at a neutral point within stator 44.

Figure 6:
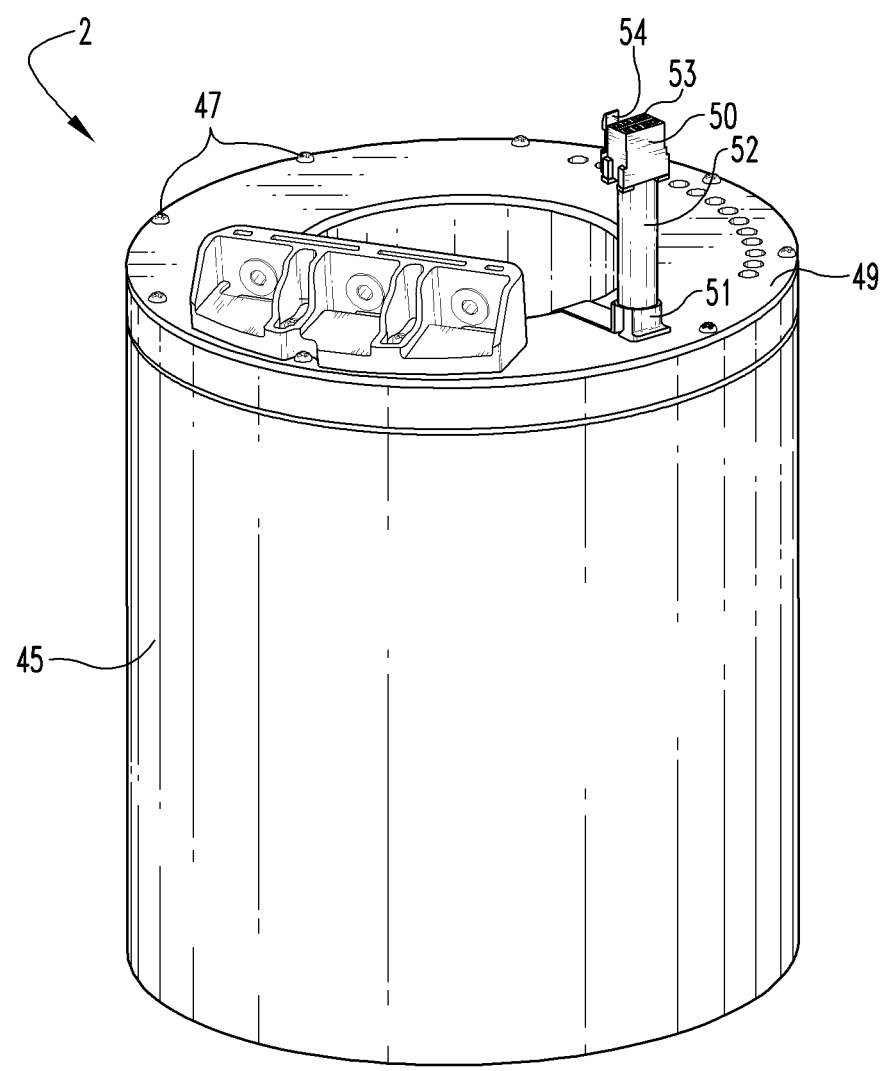
FIG. 6 is a perspective view of an electric machine having a terminal block, a connector, and an endplate, according to an exemplary embodiment.

As shown in FIG. 6, electric machine 2 has an essentially cylindrical protective housing 45 for covering internal components and for providing a support structure. An annular rear cover 49 has the same diameter as protective housing 45 and is secured thereto by use of threaded fasteners 47 which pass through respective passages (not shown) of annular rear cover 49 to engage respective threaded receptacles (not shown) formed along the circumference of an end face of protective cover 45. Rear cover 49 includes holes for positioning conductive portions of the respective connections of metal inserts 31 of terminal block 28 with phase coils 41, 42, 43 to be spaced away from contact with any other conductive surfaces, and may also include other mounting structure (not shown) such as threaded fasteners, for attaching terminal block 28 thereto. Low voltage control wires are fed from terminal block 28 to routing member 51, to communication cable 52, and to control connector 50. Routing member 51 receives any number of wires or other communication means from various sensors of electric machine 2, and transfers such wires/signals to control connector 50 via cable 52. Routing member 51 may include a sealing structure and/or strain relief to provide protection and structural support for wires passing through rear cover 49, and to prevent contamination of electric machine 2. Routing member 51 may simply pass wires therethrough, or it may be formed as one or more multi-conductor connectors with a sealing structure. Communication cable 52 has a heat and corrosion resistant outer insulation jacket that may be sealingly joined to both routing member 51 and control connector 50. Control connector 50 has any number of signal contacts 53, a keyed structure, and one or more prongs 54 or the like for securing control connector 50 to external housing 21. The keyed structure and contacts 53 of control connector 50 are formed to be securely mated with corresponding parts of an external communication connector 13, shown in FIG. 7.

Figure 7:
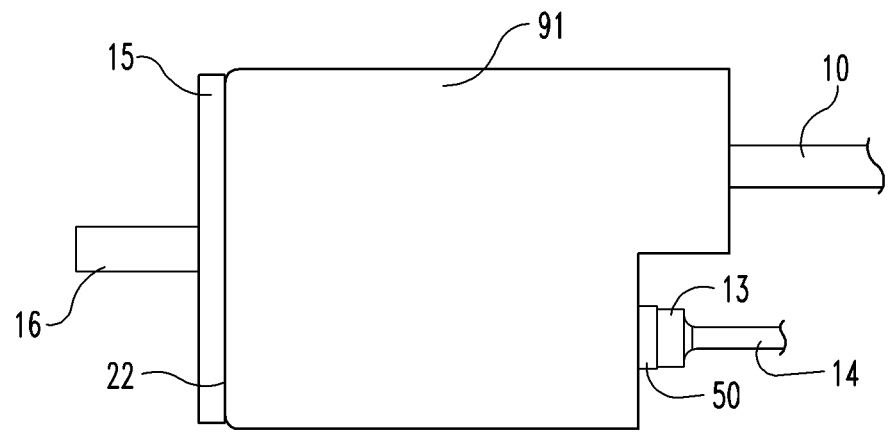
FIG. 7 is an elevation view of an electric machine and associated high voltage and low voltage connections thereto, according to an exemplary embodiment.

FIG. 7 schematically illustrates an assembled housing 91. Communication connector 13 communicates with controller 11 via communication lines 14. A housing end plate 15 is provided for mating attachment to flange 22 of housing 91. An output shaft 16 transfers mechanical power and torque from electric machine 2 to drive axle 3.

Figure 8:
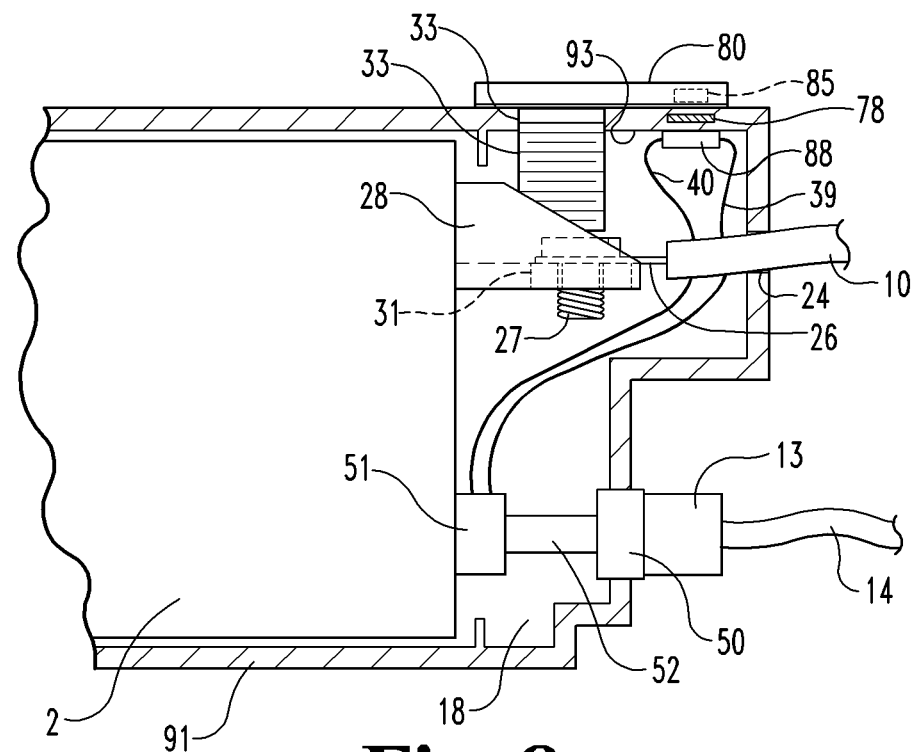
FIG. 8 is a cross section view of a portion of an electric machine and associated high voltage and communication connections thereto, according to an exemplary embodiment.

FIG. 8 shows a cross section of an electrical connection portion of a housing 91 that encloses electric machine 2. AC power lines 10 are fed through cable entry ports 24 of housing 91. Ring terminals 26 are affixed to bare wire ends of respective ones of AC power lines 10 and secured to respective ones of metal inserts 31. For example, bolts 27 may be inserted into ring terminals 26 and then secured to metal inserts 31 by tightening bolts 27 into threaded interior portions 32. Wire terminal 26 may include an insulator that minimizes exposure of high voltage and that adds structural integrity to a given wire termination. Any suitable wire terminal may be used, or AC power lines 10 may alternatively be securely connected to electric machine 2 without use of wire terminals, such as by use of set screws. Electric machine 2 may be installed in housing 91 so that three high voltage cable connection access ports 33 formed in housing 91 are concentric with bolts 27 and threaded portions 32 of respective cable receiving portions 29 of terminal block 28, or they may be offset as shown. High voltage cable entry ports 24 may include sealing members (not shown), for example rubber grommets or other appropriate structure fitted around each of AC power lines 10, for preventing contamination of interior space 18 after AC power line 10 has been installed. Communication connector 13 communicates with controller 11 via communication lines 14. Communication lines 14 include wires and other communications media (not shown) that transfer signals between controller 11 and various sensors/controls of electric machine 2, for example those for sensing temperatures, electrical currents, electrical voltages, rotational speeds, rotational angles, switching status, logic states, etc., and those for effecting switching or other control functions.

A reed switch 88 is fixedly mounted on an interior surface 93 of housing 91, at a location of interior surface 93 that is covered by cover plate 80 when such has been installed on housing 91. Preferably reed switch 88 is rated for operation in a high ambient temperature, especially regarding a plating of leads extending therefrom. A magnet 85 is enclosed within cover plate 80 and positioned therein to be in registration with reed switch 88 when cover plate 80 is installed on housing 91. Cover plate 80 may be formed of plastic to facilitate an easy enclosure of magnet 85. Any other suitable material may alternatively be used. Reed switch 88 is activated when the magnetic field of magnet 85 is in proximity thereto, for example within 0.75 inch or less. Reed switch 88 is hermetically sealed and has corrosion-resistant low voltage leads 39, 40, allowing reed switch 88 to be exposed on surface 93 of housing 91 and to be positioned at any location within the range of pull-in sensitivity to magnet 85. Reed switch 88 may be completely enclosed within housing 91 to prevent damage thereto. Reed switch 88 is placed at a predetermined location within housing 91 that is shielded from any extraneous electromagnetic field that might interfere with the designed interaction with magnet 85. For example, a shielding shelf (not shown) may be provided for placement of reed switch 88 along interior surface 93 where magnetic fields such as those generated by operation of stator 44 and/or a magnet assembly and rotor of electric machine 2 do not interfere. Any electromagnets and sensors located in nearby locations of housing 91, such as sensors utilizing pickup coils for providing feedback position and stator direction, must be accounted for respecting additional electromagnetic fields that might potentially interfere with the correct operation of reed switch 88. When electric machine 2 is a cartridge type motor that can be inserted into housing 91, reed switch 88 may be secured to such cartridge type motor before the insertion, so that reed switch 88 is thereby placed in a desired location abutting interior surface 93. Alternatively, reed switch 88 may be placed into a pocket (not shown) formed as a part of housing 91 or attached thereto. In such a case, housing 91 may be formed to allow a cover plate and its enclosed magnet 85 to attach or otherwise mesh with the pocket. In one exemplary embodiment, an iron-containing member 78 is contiguous or integrally formed with housing 91 in proximity to magnet 85, thereby forming a magnetic latch for securely holding cover plate 80 in a closed position. Iron-containing member 78 may be formed in any appropriate size and shape, may be placed on any interior or exterior surface of housing 91 or adjacent structure, may be cast or otherwise integrated into housing 91 or into an ancillary structure such as a steel bearing support structure or a steel insert, may be formed as one or more individual pieces of iron-containing material, may be formed of iron filings integrally formed with selected portions of housing 91 or an ancillary structure, may be coated with various materials such as a rust inhibitor, and may be placed into a pocket machined or otherwise formed in proximity to reed switch 88. Such may effect a dual interaction function for a single magnet 85 or group of magnets, namely activating reed switch 88 while securing cover plate 80 by magnetic attraction to iron-containing member 78. In various embodiments, one or more ancillary magnets (not shown) may be provided in selected portions of cover plate 80, and corresponding iron-containing members 78 may be provided in appropriate locations for attracting such ancillary magnets, thereby providing additional cover plate securement. Typically, when magnet 85 has an adequate magnetic field strength for assuring a strong securement of cover plate 80, reed switch 88 is activated when within 0.75 inches of magnet 85. Magnet 85 may be formed of any appropriate materials and in any shape and size. For example, neodymium magnets generally have high coercivity and high saturation magnetization, and may be formed with a small size while providing strong securement of cover plate 80. When alloyed with dysprosium or other suitable material, neodymium magnets maintain their magnetic properties at high temperature. In another example, cover plate 80 is permanently attached on one side thereof to housing 91 by one or more hinges (not shown), so that magnet 85 is brought into/out of an activation range of reed switch 88 when such hinged cover plate 80 is closed/opened to/from a covering position over access ports 33. In a further example, one or more screws or a snap-in structure (not shown) may be used for securing such hinged cover plate 80 to housing 91 in a closed position.

Low voltage leads 39, 40 are electrically connected to control connector 50 via routing member 51 and communication cable 52, and are in communication with controller 11 via communication lines 14. A low voltage may be, for example, 5 volts DC to 24 volts DC and be supplied from a portion of battery pack 7. Reed switch 88 operates as a normally-open switch that closes when in proximity to magnet 85. Such activation of reed switch 88 electrically connects leads 39, 40 to one another, thereby completing a low voltage circuit in communication with controller 11, which correspondingly enables high voltage to be supplied to AC power lines 10. As stated above, controller 11 includes firmware or the like for controlling the disconnecting of AC high voltage from AC power lines 10 in the occurrence of a predetermined sensor state or other vehicle event. The removal of cover plate 80 opens reed switch 88 and thereby creates such a sensor state.

Figure 9:
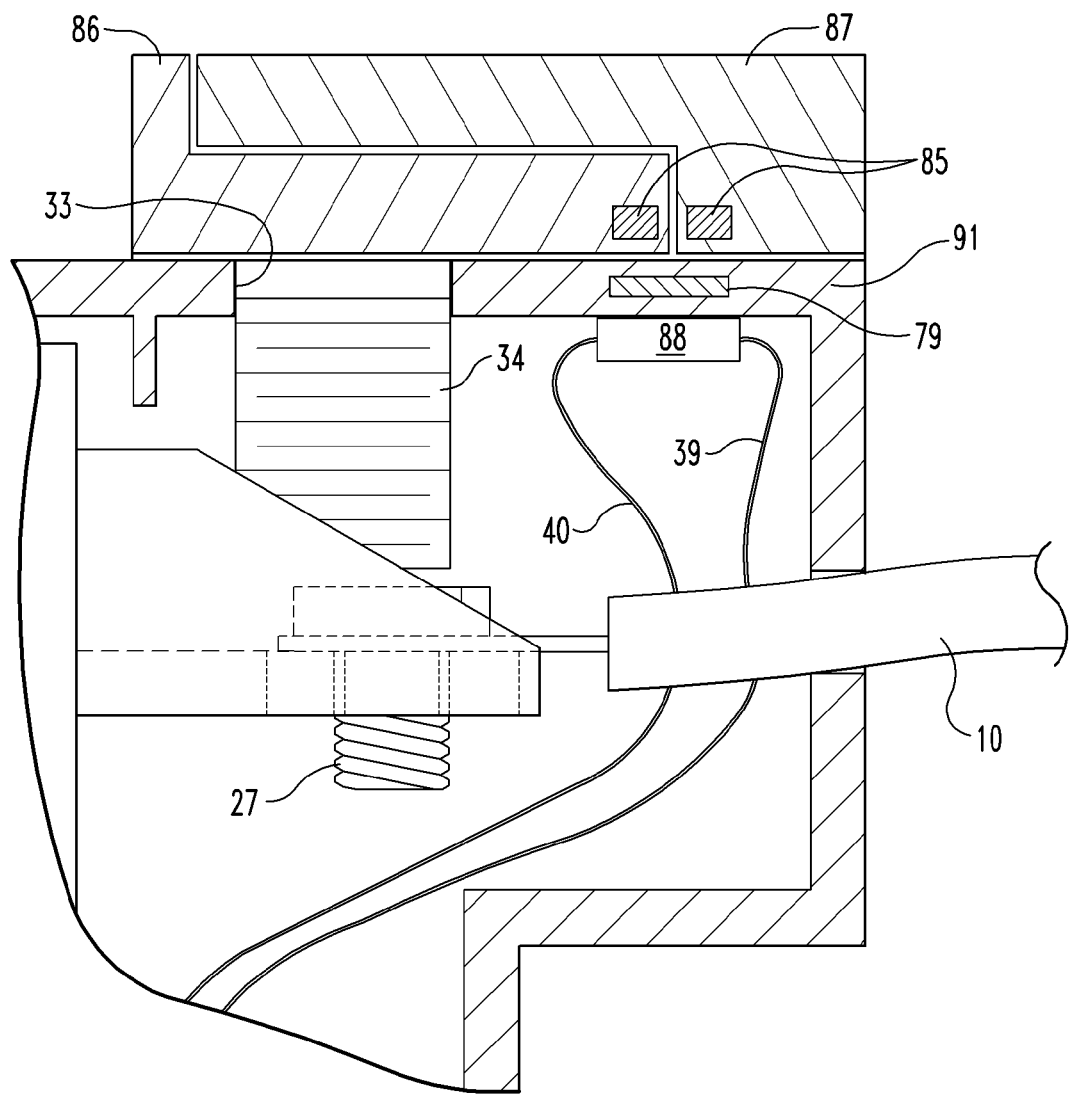
FIG. 9 is a cross section view of a portion of an electric machine having a plurality of cover portions, and associated high voltage connection thereto, according to an exemplary embodiment.

In the exemplary embodiment shown in FIG. 9, after AC power lines 10 are secured to bolts 27 and access port plugs 34 have been properly installed, a first cover portion 86 and then a second cover portion 87 may be secured to housing 91. First and second cover portions 86, 87 may be formed to have complementary shapes that snugly overlap. First and second cover portions 86, 87 may have engaging portions (not shown) that mesh with one another. First and second cover portions 86, 87 each enclose a magnet 85, respectively positioned within first and second cover portions 86, 87 so that magnets 85 are proximate reed switch 88 when first and second cover portions 86, 87 are securely fastened in place. The two magnets 85 may be chosen to have a magnetic field strength within a tight tolerance, and may be positioned respecting reed switch 88 so that reed switch 88 is opened when either of first and second cover portions 86, 87 is removed, when both of first and second cover portions 86, 87 are removed, or when a predetermined subset of several cover portions each having a magnet 85 is removed. The cumulative magnet field strength of a number of magnets 85 may thereby be utilized to activate a single reed switch 88 as part of a low voltage interlock circuit for disconnecting high voltage from an electric machine 2. Any number of cover portions may be provided and may be formed in any given shape. For example, each of first and second cover portions 86, 87 may define a covering area with a footprint that includes access port 33. Each of first and second cover portions 86, 87 may be secured to housing 91, and/or to one another. One or more iron-containing members 79 may be formed and located in a manner similar to that described above for FIG. 8. At least one iron-containing member 79 may provide one or more attraction surface(s) for a plurality of magnets 85, thereby forming a magnetic latch for securely holding cover plates 86, 87 in a closed position against housing 91. Such structure thereby effects a dual interaction function for a group of magnets 85, namely activating reed switch 88 while securing cover plates 86, 87 by magnetic attraction to iron-containing member(s) 79. In various embodiments, one or more ancillary magnets (not shown) may be contiguous or integrally formed with selected portions of cover plates 86, 87, and corresponding iron-containing members 79 may be provided in appropriate opposing locations within and/or attached to housing 91, thereby providing additional cover plate securement. Alternatively, fasteners or other structure may be provided for securing cover plates 86, 87, for example with threaded screws (not shown) or other appropriate fastener. One or more gaskets, O-rings, or other sealing structure/materials (not shown) may be provided for sealing any respective portions of cover plates 86, 87 to housing 91 or to one another.

FIGS. 10 and 11 illustrate an embodiment where a cover plate 20 is integrally formed to have three access port plug members 62, 63, 64. Each access port plug member 62, 63, 64 has an essentially cylindrical body portion 67 that extends away from a bottom surface 70 of cover plate 20 to form a plurality of prongs 66 structured for allowing plug members 62, 63, 64 to snap into respective ones of access ports 33 when cover plate 20 is fully installed on housing 21. Prongs 66 are circumferentially spaced apart from one another to facilitate free movement of prongs 66 during the installation/removal of plug members 62, 63, 64 respecting access ports 33. For example, a space 68 may be defined between adjacent ones of prongs 66 and may extend from a distal end 69 of plug [[66]] 62, 63, 64 to a location along cylindrical body portion 67. Each prong 66 has an engagement surface 71, and all engagement surfaces 71 of access port plug members 62, 63, 64 are coplanar with one another so that all engagement surfaces 71 are flush with respective mating portions 74 of an interior surface 19 of housing 21 when cover plate 20 is installed on housing 21. An outward facing surface of each prong 66 is tapered from distal end 69 to engagement surface 71, allowing each prong 66 to bend inwardly during installation and then snap back outwardly into engagement. A magnet 65 is positioned within cover plate 20. Cover plate 20 may be formed of high-strength, flexible plastic to facilitate molding magnet 65 therewithin and to facilitate the installation/removal of plug members 62, 63, 64. A single reed switch 38 is positioned at a location abutting an interior surface 19 of housing 21, so that magnet 65 is in proximity to, and thereby actuates, reed switch 38 when cover plate 20 is fully installed. Such location is preferably chosen to avoid the possibility of damage to reed switch 38 and/or leads 56, 57, for example when tools are inserted into any of access ports 33 during a servicing operation after cover plate 20 has been removed.

The actuation of reed switch 38 electrically connects leads 56, 57 to one another, thereby completing a low voltage circuit in communication with controller 11, which correspondingly enables high voltage to be supplied to AC power lines 10. Cover plate 20 may be formed to allow a removal tool (not shown) to be inserted for disengaging prongs 66 during the removal of cover plate 20. However, the respective positions of magnet 65 and reed switch 38 should be chosen to prevent any possibility that a service access could be made without first moving magnet 65 for de-activating reed switch 38. A handle 73 may be provided for allowing a service professional to grasp cover plate 20 during the installation/removal. Handle 73 may be formed integrally with cover plate 20 or alternatively may be secured to a top surface 72 thereof by use of fasteners such as threaded screws (not shown). Any of access port plug members 62, 63, 64 may be formed without prongs 66. For example, when only a middle one of access port plug members 62, 63, 64 is formed with prongs 66, an end one of access port plug members 62, 63, 64 may be lifted by a service professional, thereby moving magnet 65 and de-activating reed switch 38, which causes controller 11 to remove AC high voltage from power lines 10. A reset function of controller 11 prevents accidentally re-activating reed switch 38 and/or accidentally returning AC high voltage to power lines 10 after a first de-activation of reed switch 38. When AC power has been removed, the service professional is then able to insert the prong disengagement tool for removing the center one of one of access port plug members 62, 63, 64 and lifting cover plate 20 away from housing 21.

Various modifications may be implemented for a low voltage control circuit, for example by use of parallel or series/parallel architecture respecting interaction and communication between ones of a plurality of reed switches and a controller, where discrete resistances may optionally be configured for monitoring individual components and electrical paths.

While various embodiments have been described in detail, further modifications and adaptations may occur to those skilled in the art. However, it is to be expressly understood that such modifications and adaptations are within the spirit and scope of the present invention.

What is claimed is:

1. A vehicular subsystem for use in a vehicle having at least one wheel, the subsystem comprising:
    an electric machine operably coupled with the wheel, the electric machine having a housing;
    an electric power source for supplying electrical power to the electric machine via a plurality of high voltage lines;
    a plurality of electrical connections disposed within the housing of the electric machine for electrically connecting the high voltage lines with the electric machine;
    a controller controllably coupled to the power source;
    a plurality of access ports extending through the housing, each access port providing access to a respective one of the electrical connections;
    a cover member removably secured to the housing and requiring removal to obtain access to any of the plurality of access ports, the cover member enclosing a hidden magnet therewithin;
    a reed switch mounted proximate the cover member, when secured, within a magnetic field of the magnet, whereby the reed switch is closed when the cover member is secured and is open when the cover member is removed; and
    at least one low voltage communication line extending from the reed switch to the controller;
    wherein the controller causes the electric power source to terminate the supplying of electrical power when the cover member is removed from the housing.

2. A subsystem according to claim 1, wherein the electric power source comprises a battery bank and an inverter, each positioned at a location remote from the electric machine.

3. A subsystem according to claim 1, wherein each access ports includes a separate access port plug removably secured therein for preventing access to the respective electrical connection when so secured.

4. A subsystem according to claim 1, wherein the cover member has a plurality of access port plugs extending therefrom and positioned so that the access port plugs are inserted into respective ones of the access ports when the cover member is secured to the housing.

5. A subsystem according to claim 4, wherein the plurality of access port plugs are integrally formed portions of the cover member.

6. A subsystem according to claim 1, wherein the reed switch is mounted on the housing proximate the access ports.

7. An electric machine, comprising:
    a housing having a communication connector;
    an electric motor disposed within the housing;
    at least one electrical connection within the housing, the electrical connection being structured for securely receiving a high voltage line from a power source external to the housing;
    at least one access port formed in the housing for accessing the electrical connection;
    a magnetically actuable reed switch;
    at least one cover member removably mounted to the housing, the cover member covering the access port whereby the cover member must be removed to gain access to the electrical connection via the access port;
    at least one magnet moveable with the cover member; and
    a communication line in electrical communication with the reed switch and with the communication connector;
    wherein an external controller can be placed in communication with the reed switch via the communication connector; and wherein the reed switch is opened when the cover member is removed and is closed when the cover member is secured to the housing.

8. The electric machine according to claim 7, wherein the magnet is enclosed within the cover member.

9. The electric machine according to claim 8, wherein the at least one electrical connection comprises a plurality of electrical connections, and wherein the at least one access port comprises a plurality of access ports corresponding to the plurality of electrical connections.

10. The electric machine according to claim 9, wherein each of the plurality of access ports has a separate access port plug removably secured therein for preventing access to a respective electrical connection when so secured, and wherein it is necessary to remove the cover member for removing or installing any of the access port plugs from/into the respective access ports.

11. The electric machine according to claim 9, wherein the cover member has a plurality of access port plugs extending therefrom and positioned so that the access port plugs are inserted into respective ones of the access ports when the cover member is secured to the housing.

12. The electric machine according to claim 11, wherein the plurality of access port plugs are integrally formed portions of the cover member.

13. The electric machine according to claim 7, further comprising an iron-containing member disposed in proximity to the access port, wherein magnetic attraction of the magnet to the iron-containing member urges the cover member into securement with the housing.

14. The electric machine according to claim 7, wherein the at least one cover member comprises a plurality of cover members each having a magnet.

15. The electric machine according to claim 14, further comprising at least one iron-containing member disposed in proximity to the access port, wherein magnetic attraction of the magnets to the iron-containing member urges the cover members into securement with the housing.

16. The electric machine according to claim 8, wherein the reed switch is mounted on the housing proximate the access ports.

17. The electric machine according to claim 8, comprising a plurality of cover members each enclosing a magnet, wherein the reed switch is closed only when all cover members are mounted on the housing.

18. The electric machine according to claim 8, comprising a plurality of cover members each enclosing a magnet, wherein the reed switch is opened when any of the plurality of cover members is removed.

19. The electric machine according to claim 8, comprising a plurality of cover members each enclosing a magnet, wherein the reed switch is opened when a portion of the cover members is removed.

20. An electric machine, comprising:
a housing enclosing, in an interior portion thereof, a rotor and a stator having at least one coil, the rotor being structured for outputting mechanical torque to a drive train of an electric vehicle;
at least one electrical connection within the interior portion, the electrical connection being structured for securely receiving a high voltage line to allow the coil to be connected with an external power source;
at least one access port formed in the housing to gain access to the electrical connection;
a reed switch disposed in proximity to the electrical connection;
a cover member removably mounted to the housing to define an area covering the access port and the reed switch, whereby the cover member must be removed to access the access port, the cover member comprising a plurality of cover portions each having a magnet, the cumulative magnetic field strength of the plurality of magnets closing the reed switch when the cover member is mounted, the single reed switch opening when at least one of the plurality of cover portions is removed;
wherein communication of opening of the single reed switch disconnects high voltage being provided to the high voltage line by the external power source.

21. The electric machine according to claim 7, wherein the external controller which can be placed in communication with the reed switch via the communication connector is configured to prevent electrical power transmission from the power source to the electrical connection over the high voltage line when the cover member is removed from the housing.

* * * * *